(12) United States Patent
Xiong

(10) Patent No.: US 12,530,076 B2
(45) Date of Patent: Jan. 20, 2026

(54) DYNAMICALLY-ADAPTIVE PLANAR TRANSFORMATIONS FOR VIDEO SEE-THROUGH (VST) EXTENDED REALITY (XR)

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/670,128

(22) Filed: May 21, 2024

(65) Prior Publication Data

US 2025/0076969 A1    Mar. 6, 2025

Related U.S. Application Data

(60) Provisional application No. 63/535,454, filed on Aug. 30, 2023.

(51) Int. Cl.
G06F 3/01    (2006.01)

(52) U.S. Cl.
CPC .............. *G06F 3/012* (2013.01); *G06F 3/013* (2013.01)

(58) Field of Classification Search
CPC .......... G06F 3/013; G06F 3/011; G06F 3/012; G06T 19/006; G02B 27/017; G02B 2027/0187
See application file for complete search history.

(56) References Cited

U.S. PATENT DOCUMENTS

| 9,514,571 B2 | 12/2016 | Williams et al. |
| 9,721,395 B2 | 8/2017 | Chan et al. |
| 10,313,661 B2 | 6/2019 | Kass |
| 10,529,063 B2 | 1/2020 | Rodriguez et al. |
| 10,955,685 B2 | 3/2021 | Osmanis et al. |

(Continued)

FOREIGN PATENT DOCUMENTS

| KR | 10-2018-0121994 A | 11/2018 |
| KR | 10-2023-0122177 | 8/2023 |

OTHER PUBLICATIONS

International Search Report and Written Opinion of the International Searching Authority dated Sep. 26, 2024 in connection with International Patent Application No. PCT/KR2024/008878, 13 pages.

*Primary Examiner* — Koosha Sharifi-Tafreshi

(57) ABSTRACT

A method includes obtaining multiple image frames captured using one or more imaging sensors of a video see-through (VST) extended reality (XR) device while a user's head is at a first head pose and depth data associated with the image frames. The method also includes predicting a second head pose of the user's head when rendered images will be displayed. The method further includes projecting at least one of the image frames onto one or more first planes to generate at least one projected image frame. The method also includes transforming the at least one projected image frame from the one or more first planes to one or more second planes corresponding to the second head pose to generate at least one transformed image frame. The method further includes rendering the at least one transformed image frame for presentation on one or more displays of the VST XR device.

20 Claims, 13 Drawing Sheets

(56) References Cited

U.S. PATENT DOCUMENTS

| | | | |
|---|---|---|---|
| 11,017,712 B2 * | 5/2021 | Kuwahara | G06F 3/147 |
| 11,043,018 B2 * | 6/2021 | Zhang | G02B 27/017 |
| 11,704,877 B2 | 7/2023 | Peri et al. | |
| 12,008,723 B2 | 6/2024 | Miller et al. | |
| 2014/0375547 A1 * | 12/2014 | Katz | G06F 3/011 |
| | | | 345/156 |
| 2015/0310665 A1 * | 10/2015 | Michail | G06F 3/013 |
| | | | 345/419 |
| 2016/0364904 A1 | 12/2016 | Parker et al. | |
| 2017/0243324 A1 | 8/2017 | Mierle et al. | |
| 2018/0253868 A1 | 9/2018 | Bratt et al. | |
| 2020/0368616 A1 | 11/2020 | Delamont | |
| 2022/0326527 A1 * | 10/2022 | Taylor | G06F 3/012 |
| 2022/0397955 A1 | 12/2022 | Lahr et al. | |
| 2023/0082705 A1 | 3/2023 | Trepte | |

\* cited by examiner

DYNAMICALLY-ADAPTIVE PLANAR TRANSFORMATIONS FOR VIDEO SEE-THROUGH (VST) EXTENDED REALITY (XR)

CROSS-REFERENCE TO RELATED APPLICATION AND PRIORITY CLAIM

This application claims priority under 35 U.S.C. § 119(e) to U.S. Provisional Patent Application No. 63/535,454 filed on Aug. 30, 2023. This provisional patent application is hereby incorporated by reference in its entirety.

TECHNICAL FIELD

This disclosure relates generally to extended reality (XR) systems and processes. More specifically, this disclosure relates to dynamically-adaptive planar transformations for video see-through (VST) XR.

BACKGROUND

Extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

SUMMARY

This disclosure relates to dynamically-adaptive planar transformations for video see-through (VST) extended reality (XR).

In a first embodiment, a method includes obtaining (i) multiple image frames captured using one or more imaging sensors of a VST XR device while a user's head is at a first head pose and (ii) depth data associated with the image frames. The method also includes predicting a second head pose of the user's head when rendered images will be displayed. The method further includes projecting at least one of the image frames onto one or more first planes to generate at least one projected image frame. The method also includes transforming the at least one projected image frame from the one or more first planes to one or more second planes corresponding to the second head pose to generate at least one transformed image frame. In addition, the method includes rendering the at least one transformed image frame for presentation on one or more displays of the VST XR device.

In a second embodiment, a VST XR device includes one or more displays and at least one processing device. The at least one processing device is configured to obtain (i) multiple image frames captured using one or more imaging sensors while a user's head is at a first head pose and (ii) depth data associated with the image frames. The at least one processing device is also configured to predict a second head pose of the user's head when rendered images will be displayed. The at least one processing device is further configured to project at least one of the image frames onto one or more first planes to generate at least one projected image frame. The at least one processing device is also configured to transform the at least one projected image frame from the one or more first planes to one or more second planes corresponding to the second head pose to generate at least one transformed image frame. In addition, the at least one processing device is configured to render the at least one transformed image frame for presentation on the one or more displays.

In a third embodiment, a non-transitory machine readable medium contains instructions that when executed cause at least one processor of a VST XR device to obtain (i) multiple image frames captured using one or more imaging sensors of the VST XR device while a user's head is at a first head pose and (ii) depth data associated with the image frames. The non-transitory machine readable medium also contains instructions that when executed cause the at least one processor to predict a second head pose of the user's head when rendered images will be displayed. The non-transitory machine readable medium further contains instructions that when executed cause the at least one processor to project at least one of the image frames onto one or more first planes to generate at least one projected image frame. The non-transitory machine readable medium also contains instructions that when executed cause the at least one processor to transform the at least one projected image frame from the one or more first planes to one or more second planes corresponding to the second head pose to generate at least one transformed image frame. In addition, the non-transitory machine readable medium contains instructions that when executed cause the at least one processor to render the at least one transformed image frame for presentation on one or more displays of the VST XR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
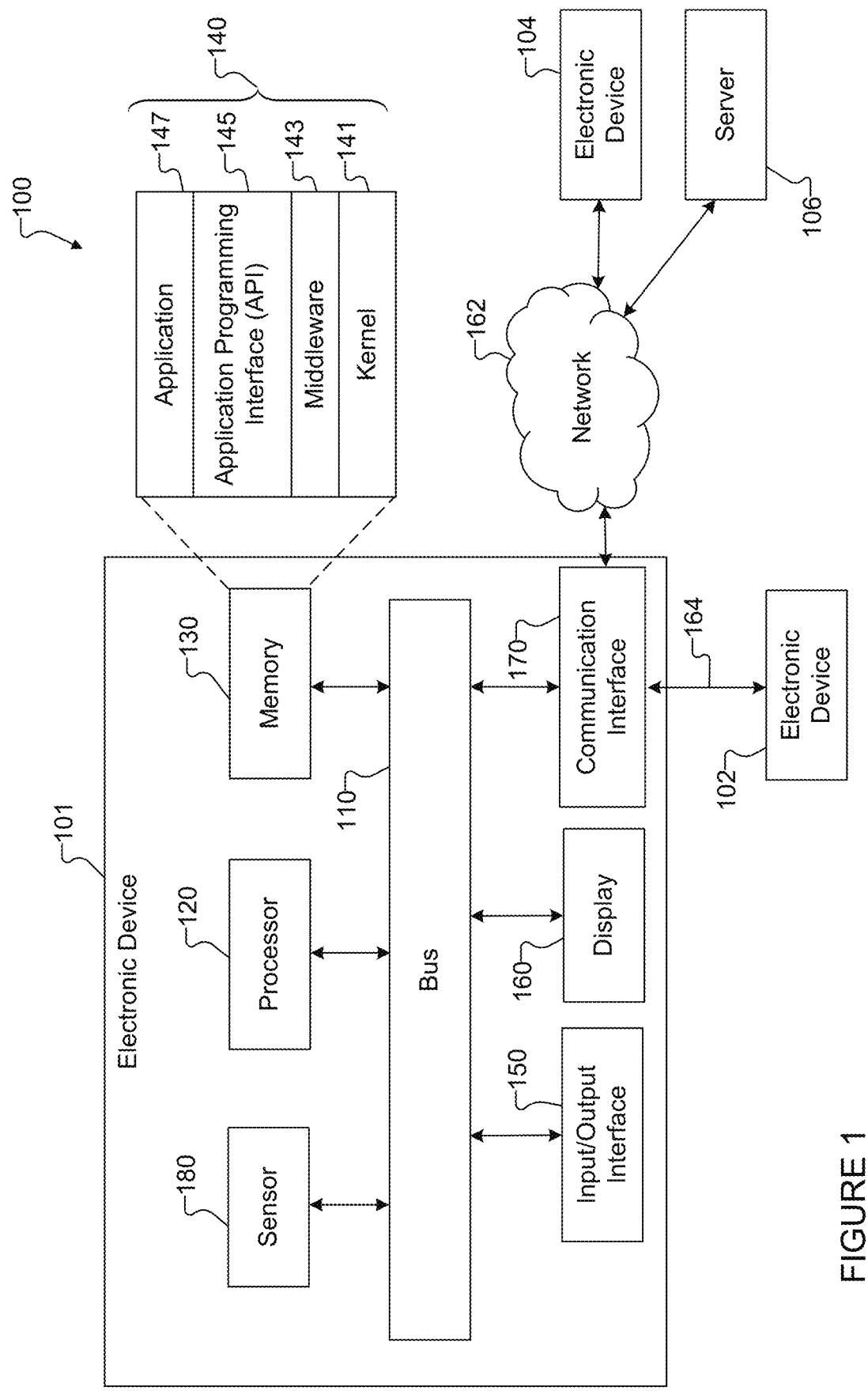
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

Optical see-through (OST) XR systems refer to XR systems in which users directly view real-world scenes through head-mounted devices (HMDs). Unfortunately, OST XR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements. In contrast to OST XR systems, video see-through (VST) XR systems (also called "passthrough" XR systems) present users with generated video sequences of real-world scenes. VST XR systems can be built using virtual reality (VR) technologies and can have various advantages over OST XR systems. For example, VST XR systems can provide wider fields of view and can provide improved contextual augmented reality.

VST XR devices typically use see-through cameras to capture image frames of their surrounding environments, and these image frames are processed and presented on displays of the VST XR devices. Unfortunately, during image frame processing, latencies can be created, such as when the image frames being processed have higher resolutions and therefore contain more image data. These latencies can be immediately noticed by a user of a VST XR device, such as when the latencies cause incorrect or mistimed image frames to be displayed.

This disclosure provides various techniques supporting dynamically-adaptive planar transformations for VST XR. As described in more detail below, multiple image frames captured using one or more imaging sensors of a VST XR device while a user's head is at a first head pose can be obtained, and depth data associated with the image frames can be obtained. A second head pose of the user's head when rendered images will be displayed can be predicted, such as based on a head motion model. At least one of the image frames can be projected onto one or more first planes to generate at least one projected image frame. In some cases, the one or more first planes may include two or more planes associated with one or more objects in a scene captured in the image frames. The at least one projected image frame can be transformed from the one or more first planes to one or more second planes corresponding to the second head pose to generate at least one transformed image frame. The at least one transformed image frame can be rendered for presentation on one or more displays of the VST XR device.

In this way, these techniques support the generation of final views for a VST XR device, which can be accomplished using reduced latencies. For example, reprojection can be used to convert image frames captured at one user head pose into image frames at another user head pose. While depth-based reprojection algorithms may perform reprojection more accurately, depth-based reprojection algorithms generally need dense depth maps, which can be difficult or impossible to obtain (especially at higher resolutions). The disclosed techniques support the use of an efficient dynamic adaptive transformation for a VST XR pipeline that can reproject image frames to one or more planes without requiring dense depth maps (although dense depth maps could be used if available). The disclosed techniques also support the use of adaptively-selected projecting planes, which can be relevant to the contents within a scene on which a user focuses. More specifically, based on the contents within the scene on which the user focuses, the disclosed techniques can adaptively select a single plane or multiple planes in a reprojection transformation for creating new image frames. In addition, the reprojection transformation can provide for additional corrections like parallax correction. Overall, these techniques can help to improve efficiency, reduce computational loads, and/or reduce latencies in a VST XR pipeline.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to dynamically-adaptive planar transformations for VST XR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform dynamically-adaptive planar transformations for VST XR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include cameras or other imaging sensors, which may be used to capture images of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to dynamically-adaptive planar transformations for VST XR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
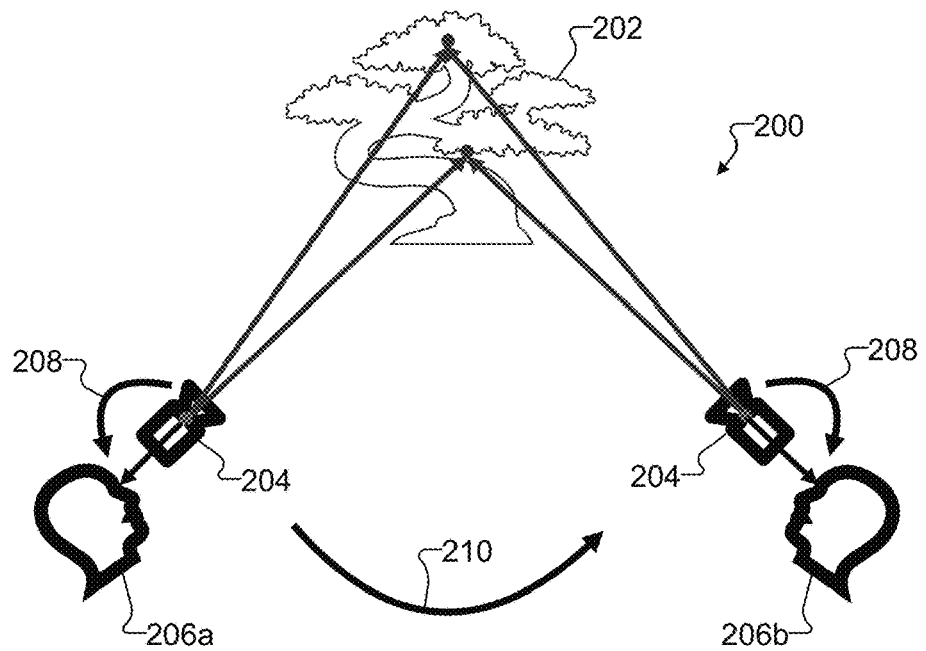
FIGS. 2A and 2B illustrate example reprojections in a video see-through (VST) extended reality (XR) device in accordance with this disclosure.
Figure 2B:
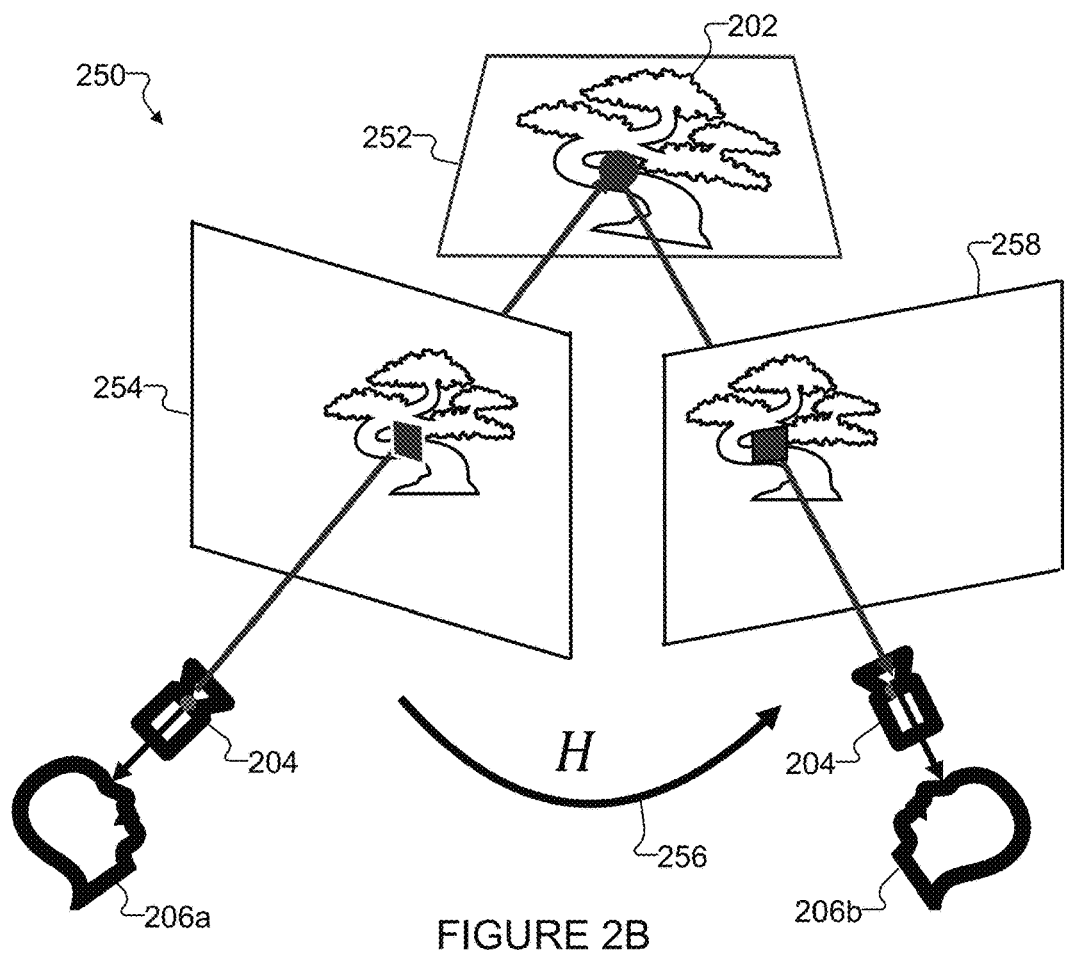

FIGS. 2A and 2B illustrate example reprojections in a VST XR device in accordance with this disclosure. For ease of explanation, the reprojections shown in FIGS. 2A and 2B are described as being used in the electronic device 101 in the network configuration 100 of FIG. 1. However, the reprojections shown in FIGS. 2A and 2B may be used with any other suitable device(s) and in any other suitable system(s).

As shown in FIG. 2A, a depth-based reprojection 200 is illustrated. In this example, a three-dimensional (3D) scene is being viewed, where the scene includes an object 202 (which represents a tree in this example). At least one see-through camera 204 can be used to capture image frames of the scene, and the see-through camera(s) 204 may represent one or more imaging sensors 180 of the electronic device 101. The VST XR device here is mobile, and the scene may be viewed at multiple head poses 206a-206b of a user. Note that the change between the head poses 206a-206b is exaggerated for illustration and can be much smaller. To present the scene to the user, image frames may be captured at the head pose 206a, and a transformation 208 can be applied to the image frames. When the user's head pose changes, new image frames may be captured at the head pose 206b, and the transformation 208 can again be applied to the new image frames. Alternatively, a depth-based reprojection 210 can be applied to convert the image frames generated at the head pose 206a into image frames suitable for display at the head pose 206b. However, the depth-based reprojection 210 typically requires full depth maps associated with the image frames, meaning the resolution of the depth maps is close to or matches the resolution of the image frames.

As shown in FIG. 2B, a planar reprojection 250 is illustrated. In this example, the 3D scene is being treated as residing on a projecting plane 252. The scene is imaged using the see-through camera(s) 204 and results in image frames being captured at an image plane 254. When the user's head moves from the head pose 206a to the head pose 206b, a planar reprojection 256 can be performed by applying a transformation matrix H to convert the image frames from the image plane 254 to the image plane 258. The planar reprojection 256 can be computationally much easier to perform than the depth-based reprojection 210, which can reduce latency in the VST XR device. In some embodiments, the planar reprojection 256 can be based on a normal vector of the projecting plane 252, a depth of the projecting plane 252, and a difference between the head poses 206a-206b. While the depth of the projecting plane 252 can be used here, there is no need to identify a depth of each pixel in the captured image frames. As a result, the planar reprojection 256 can be performed without requiring the use of dense depth data.

Although FIGS. 2A and 2B illustrate examples of reprojections in a VST XR device, various changes may be made to FIGS. 2A and 2B. For example, planar transformations may be used in various situations, and FIGS. 2A and 2B do no limit the scope of this disclosure to any particular use of the planar transformations.

FIGS. 3A through 3D illustrate example planar reprojections in a VST XR device in accordance with this disclosure. For ease of explanation, the planar reprojections shown in FIGS. 3A through 3D are described as being used in the electronic device 101 in the network configuration 100 of FIG. 1. However, the planar reprojections shown in FIGS. 3A through 3D may be used with any other suitable device(s) and in any other suitable system(s).

Figure 3A:
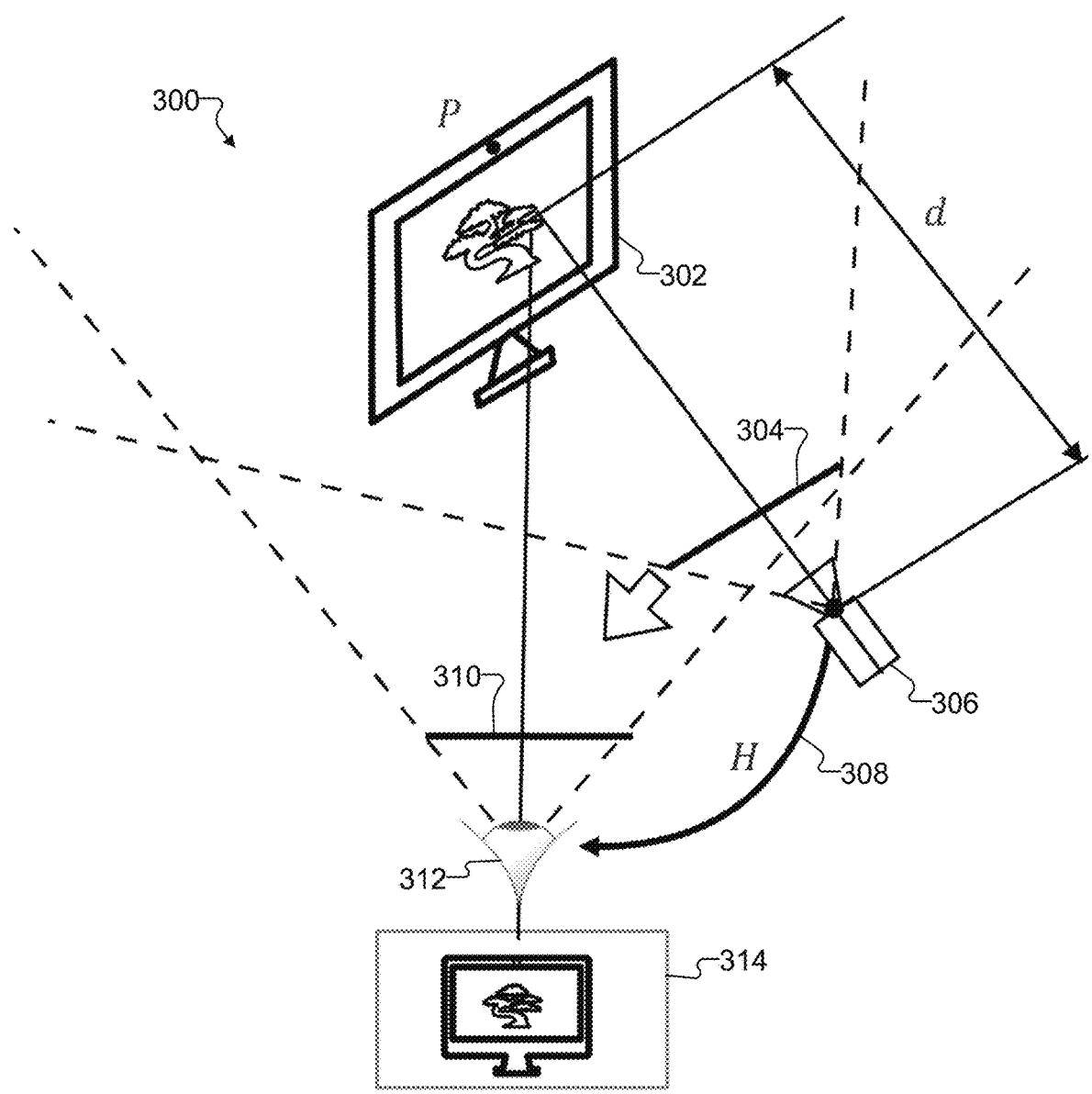
FIGS. 3A through 3D illustrate example planar reprojections in a VST XR device in accordance with this disclosure.

As shown in FIG. 3A, a planar reprojection 300 represents a single-plane reprojection. As can be seen here, a scene being imaged includes an object 302, and a projecting plane P is associated with the object 302. In this example, the object 302 represents an external display device, although other types of objects may be viewed. Also, in this example, the projecting plane P is associated with a screen of the external display device, although other types of projecting planes may be defined. An image plane 304 is associated with a reference camera 306. The reference camera 306 represents a virtual camera that is created based on the projecting plane P, such as based on a surface normal of the projecting plane P and a depth d of the projecting plane P. A planar transformation 308 can be performed by applying a transformation matrix H to each image frame as projected onto the projecting plane P in order to transform the image frame from the image plane 304 to an image plane 310. The image plane 310 represents an image plane associated with a virtual camera assumed to exist at the location of a user's eye 312. Among other things, the planar transformation 308 transforms the captured image frames in order to generate image frames 314, which capture the object 302.

Figure 3B:
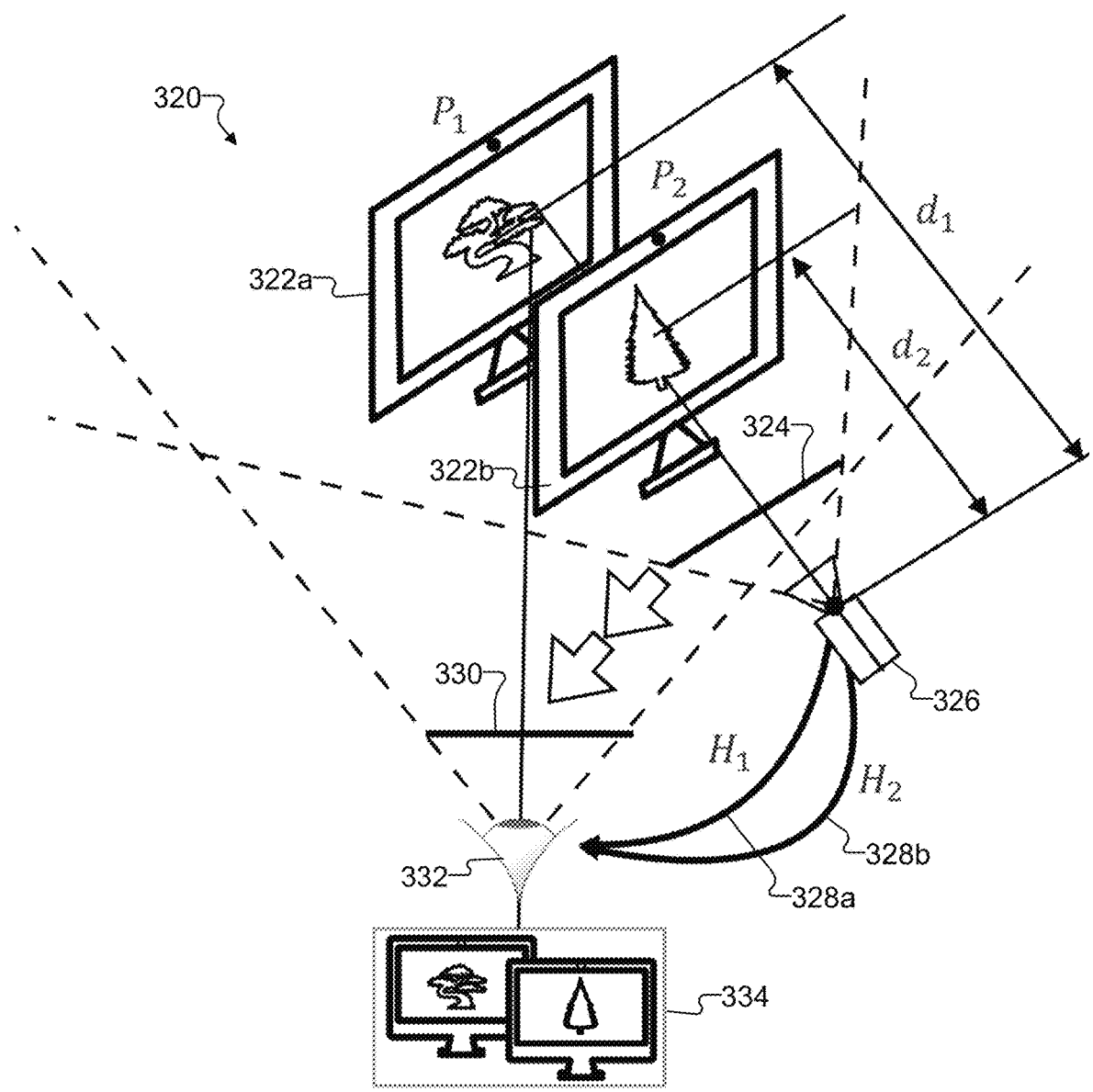

As shown in FIG. 3B, a planar reprojection 320 represents a dual-plane reprojection. As can be seen here, a scene being imaged includes two objects 322a-322b, and projecting planes $P_1$ and $P_2$ are associated with the objects 322a-322b. In this example, the objects 322a-322b represent external display devices, although other types of objects may be viewed here. Also, in this example, the projecting planes $P_1$ and $P_2$ are associated with screens of the external display devices, although other types of projecting planes may be defined. In addition, in this example, the objects 322a-322b have the same general orientation but different depths $d_1$ and $d_2$ within the scene, indicating that the projecting planes $P_1$ and $P_2$ are generally parallel with one another and are spaced apart from one another.

Because the projecting planes $P_1$ and $P_2$ are generally parallel with one another, a single image plane 324 can be associated with a single reference camera 326. The reference camera 326 represents a virtual camera that is created based on the projecting planes $P_1$ and $P_2$, such as based on surface normals of the projecting planes $P_1$ and $P_2$ and depths $d_1$ and $d_2$ of the projecting planes $P_1$ and $P_2$. Planar transformations 328a-328b can be performed by applying a transformation matrix $H_1$ to each image frame as projected onto the projecting plane $P_1$ and by applying a transformation matrix $H_2$ to each image frame as projected onto the projecting plane $P_2$ in order to convert the image frames from the image plane 324 to an image plane 330. The image plane 330 represents an image plane associated with a virtual camera assumed to exist at the location of a user's eye 332. The transformed image frames can be combined in order to generate image frames 334, which capture the objects 322a-322b. The planar transformations 328a-328b thereby allow the details of the two projecting planes $P_1$ and $P_2$ associated with the objects 322a-322b to be viewed by the user, so the user can obtain a clear view of both objects 322a-322b. The planar transformations 328a-328b can also generate image frames for viewing that have correct parallax.

Figure 3C:
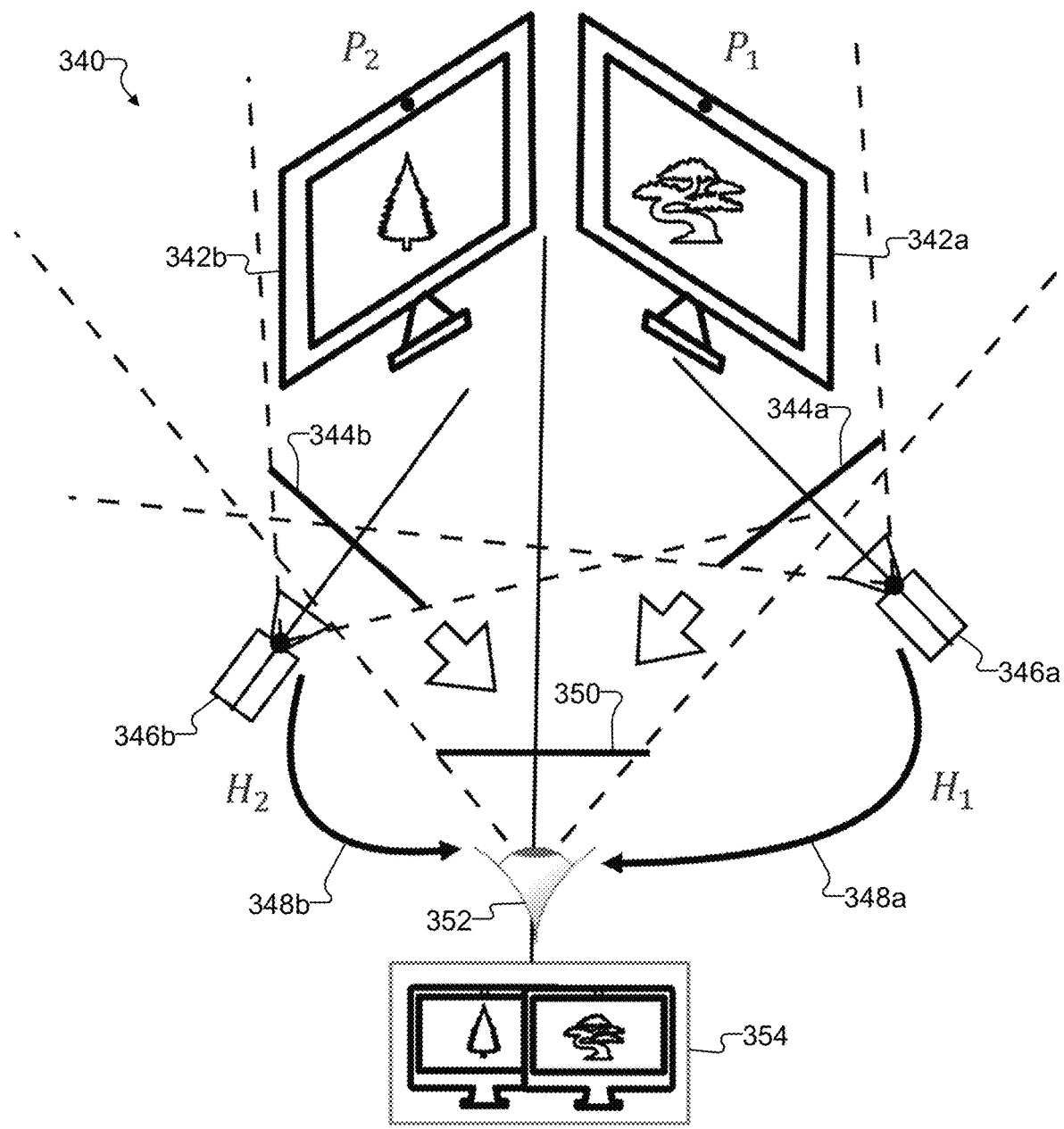

As shown in FIG. 3C, a planar reprojection 340 represents a dual-plane reprojection. As can be seen here, a scene being imaged includes two objects 342a-342b, and projecting planes $P_1$ and $P_2$ are associated with the objects 342a-342b. In this example, the objects 342a-342b represents external display devices, although other types of objects may be viewed here. Also, in this example, the projecting planes $P_1$ and $P_2$ are associated with screens of the external display devices, although other types of projecting planes may be defined. In addition, in this example, the objects 342a-342b do not have the same general orientation, meaning the projecting planes $P_1$ and $P_2$ are not generally parallel with one another. Each object 342a-342b has an associated depth within the scene, which may or may not be equal to the depth of the other object.

Because the projecting planes $P_1$ and $P_2$ are not generally parallel with one another, multiple image planes 344a-344b can be associated with multiple reference cameras 346a-346b. The reference cameras 346a-346b represent virtual cameras that are created based on the projecting planes $P_1$ and $P_2$, such as based on surface normals of the projecting planes $P_1$ and $P_2$ and depths $d_1$ and $d_2$ of the projecting planes $P_1$ and $P_2$. Planar transformations 348a-348b can be performed by applying a transformation matrix $H_1$ to each image frame as projected onto the projecting plane $P_1$ and by applying a transformation matrix $H_2$ to each image frame as projected onto the projecting plane $P_2$ in order to convert the image frames from the image planes 344a-344b to an image plane 350. The image plane 350 represents an image plane associated with a virtual camera assumed to exist at the location of a user's eye 352. The transformed image frames can be combined in order to generate image frames 354, which capture the objects 342a-342b. The planar transformations 348a-348b thereby allow the details of the two projecting planes $P_1$ and $P_2$ associated with the objects 342a-342b to be viewed by the user, so the user can obtain a clear view of both objects 342a-342b. The planar transformations 348a-348b can also generate image frames for viewing that have correct parallax.

Figure 3D:
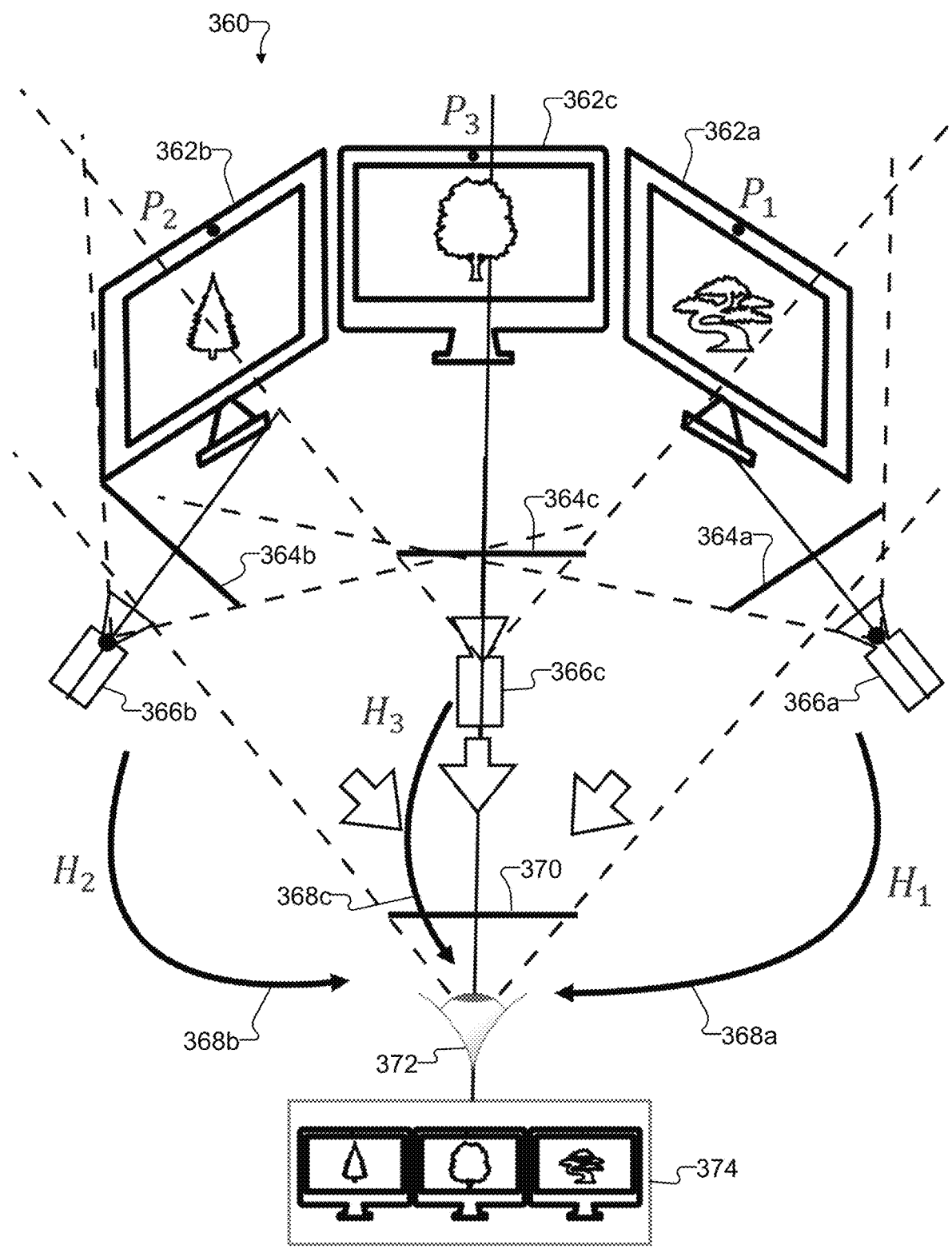

As shown in FIG. 3D, a planar reprojection 360 represents a multi-plane reprojection, which in this case is a three-plane reprojection. As can be seen here, a scene being imaged includes three objects 362a-362c, and projecting planes $P_1$-$P_3$ are associated with the objects 362a-362c. In this example, the objects 362a-362c represent external display devices, although other types of objects may be viewed here. Also, in this example, the projecting planes $P_1$-$P_3$ are associated with screens of the external display devices, although other types of projecting planes may be defined. In addition, in this example, the objects 362a-362c do not have the same general orientation, meaning the projecting planes $P_1$-$P_3$ are not generally parallel with one another. Each object 362a-362c has an associated depth within the scene, which may or may not be equal to the depth(s) of the other objects.

Because the projecting planes $P_1$-$P_3$ are not generally parallel with one another, multiple image planes 364a-364b can be associated with multiple reference cameras 366a-366b. The reference cameras 366a-366b represent virtual cameras that are created based on the projecting planes $P_1$-$P_3$, such as based on surface normals of the projecting planes $P_1$-$P_3$ and depths of the projecting planes $P_1$-$P_3$. Planar transformations 368a-368c can be performed by applying a transformation matrix $H_1$ to each image frame as projected onto the projecting plane $P_1$, by applying a transformation matrix $H_2$ to each image frame as projected onto the projecting plane $P_2$, and by applying a transformation matrix $H_3$ to each image frame as projected onto the projecting plane $P_3$ in order to convert the image frames from the image planes 364a-364c to an image plane 370. The image plane 370 represents an image plane associated with a virtual camera assumed to exist at the location of a user's eye 372. The transformed image frames can be combined in order to generate image frames 374, which capture the objects 362a-362c. The planar transformations 368a-368c thereby allow the details of the three projecting planes $P_1$-$P_3$ associated with the objects 362a-362c to be viewed by the user, so the user can obtain a clear view of the objects 362a-362c. The planar transformations 368a-368c can also generate image frames for viewing that have correct parallax.

The techniques described below can be used to support these types of planar transformations or other suitable planar transformations. This allows a VST XR device to effectively perform planar transformations in order to support final view generation. Since scenes being viewed by a VST XR device can routinely change, the planar transformation or transformations that are used can vary depending on the circumstances. As a result, the planar transformation or transformations that are used can be dynamically controlled as described below. Note that any suitable projecting plane or planes in a scene may be selected for use during planar transformation(s), such as when one or more surfaces of at least one object are generally planar. Also note that the selection of the projecting plane(s) in a scene may occur in any suitable manner. In some cases, one or more projecting planes can be identified automatically, such as by using computer vision and/or one or more machine learning algorithms. In some VST XR devices, projecting plane detection can be performed as part of one or more other processes, such as 3D object detection, 3D object recognition, or 3D scene reconstruction.

Although FIGS. 3A through 3D illustrate examples of planar reprojections in a VST XR device, various changes may be made to FIGS. 3A through 3D. For example, planar reprojections may involve any suitable number(s) of objects and any suitable configuration(s) or arrangement(s) of the object(s). Also, the number of projecting planes and the number of reference cameras used can vary.

Figure 4A:
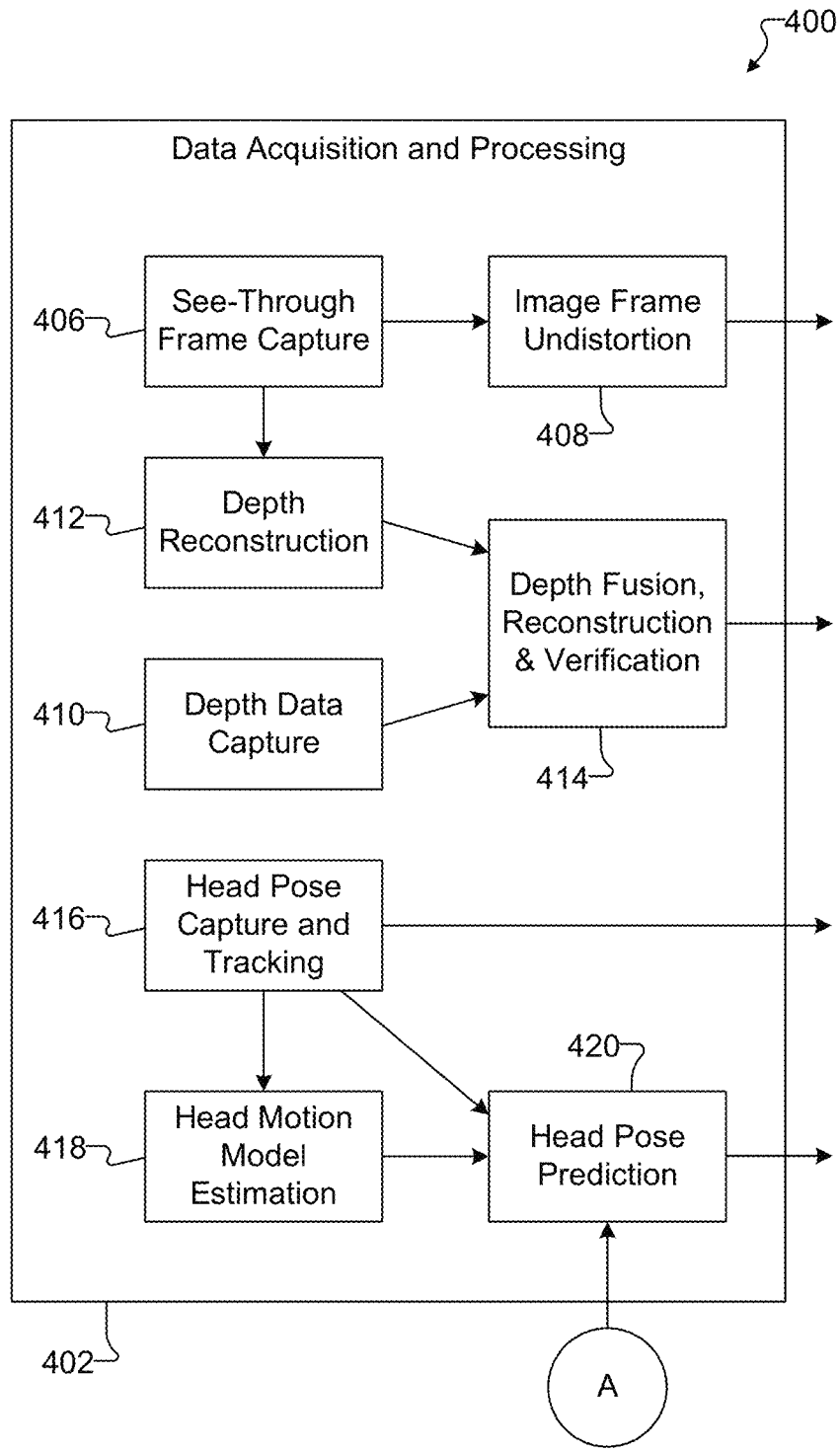
FIGS. 4A and 4B illustrate an example functional architecture supporting dynamically-adaptive planar transformations for VST XR in accordance with this disclosure.
Figure 4B:
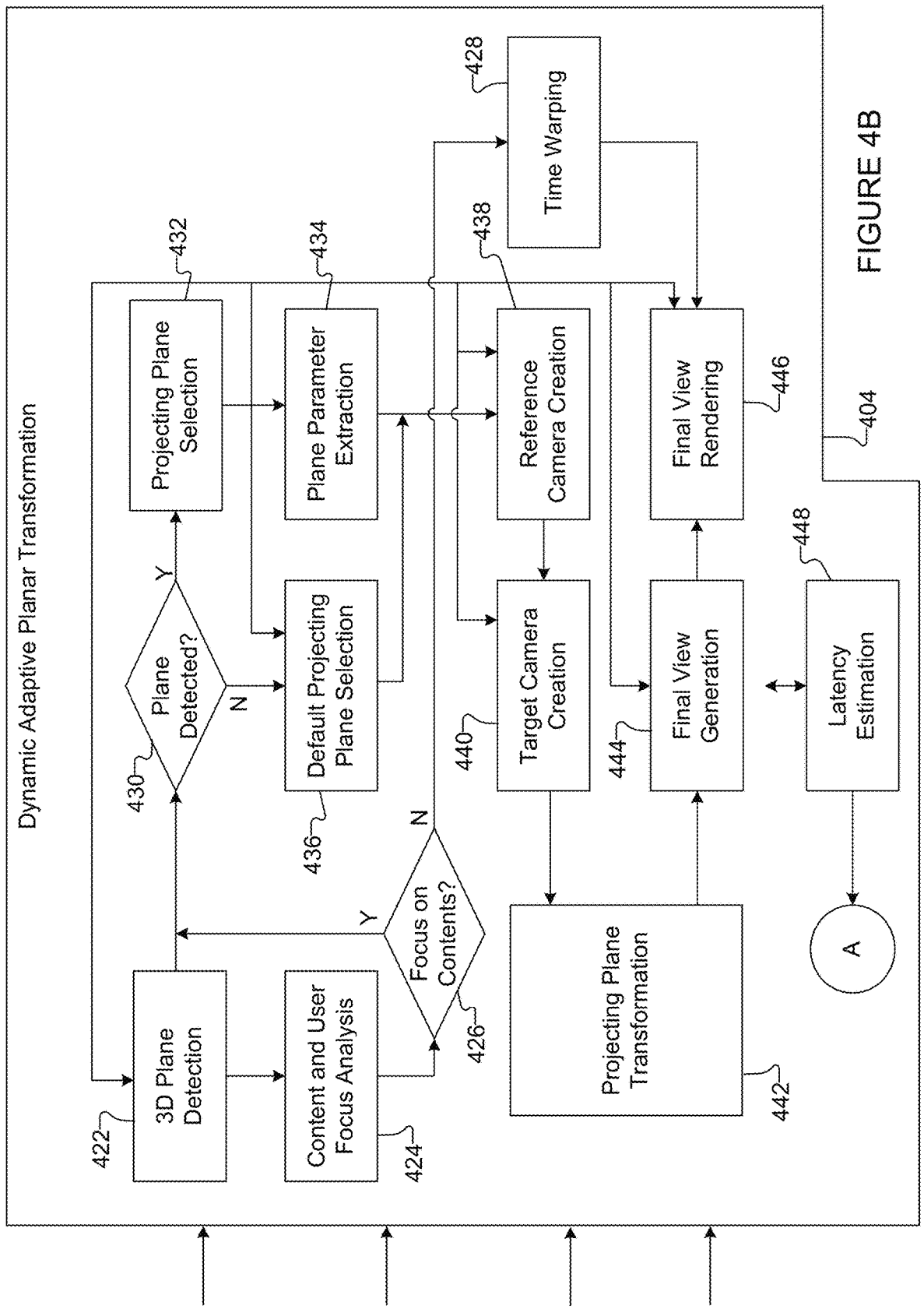

FIGS. 4A and 4B illustrate an example functional architecture 400 supporting dynamically-adaptive planar transformations for VST XR in accordance with this disclosure. For ease of explanation, the architecture 400 of FIGS. 4A and 4B is described as being implemented using the electronic device 101 in the network configuration 100 of FIG. 1, where the architecture 400 may be used to support planar transformations like those shown in FIGS. 3 through 3D. However, the architecture 400 may be implemented using any other suitable device(s) and in any other suitable system(s), and the architecture 400 may support any other suitable planar transformations.

As shown in FIGS. 4A and 4B, the functional architecture 400 is generally divided into two primary operations, namely a data acquisition and processing operation 402 and a dynamic adaptive planar transformation operation 404. The data acquisition and processing operation 402 generally operates to obtain image frames and other data for processing by the dynamic adaptive planar transformation operation 404. The dynamic adaptive planar transformation operation 404 generally operates to apply one or more planar transformations to the image frames (if appropriate), where the planar transformation or transformations applied are dynamic and can vary depending on the circumstances, such as based on the contents of the scene being imaged.

As shown in FIG. 4A, the data acquisition and processing operation 402 includes a see-through image frame capture function 406, which generally operates to obtain see-through image frames captured using one or more see-through cameras 204. For example, the image frame capture function 406 may be used to obtain see-through images at a desired frame rate, such as 30, 60, 90, or 120 frames per second. Each see-through image frame can have any suitable size, shape, and resolution and include image data in any suitable domain. As particular examples, each see-through image frame may include RGB image data, YUV image data, or Bayer or other raw image data.

An image frame undistortion function 408 generally operates to process the captured image frames in order to reduce camera lens distortions in the image frames. An imaging sensor 180 used in or with a VST XR device typically includes at least one lens, and the at least one lens can create radial, tangential, or other type(s) of distortion(s) in captured image frames. The image frame undistortion function 408 can adjust the captured image frames to correct for the radial, tangential, or other type(s) of distortion(s). This results in the generation of undistorted image frames. In some cases, the image frame undistortion function 408 may include or have access to a camera matrix and a lens distortion model, which can be used to identify how the image frames should be adjusted to correct for the camera lens distortion(s). A camera matrix is often defined as a three-by-three matrix that includes two focal lengths in the x and y directions and the principal point of the camera defined using x and y coordinates. A lens distortion model is often defined as a mathematical model that indicates how image frames can be undistorted, which can be derived based on the specific lens or other optical component(s) being used.

The data acquisition and processing operation 402 also includes a depth data capture function 410 and a depth reconstruction function 412. The depth data capture function 410 generally operates to obtain depth data related to the image frames being captured. For example, at least one depth sensor 180 used in or with a VST XR device may capture depth data within a scene being imaged using the see-through camera(s) 204. In some cases, the depth data that is obtained here can have a resolution that is less than (and possibly significantly less than) the resolution of the captured image frames. For instance, the depth data may have a resolution that is equal to or less than half a resolution of each of the captured image frames. In some cases, the captured image frames may have a 3K or 4K resolution, and the depth data may have a resolution of 320 depth values by 320 depth values.

The depth reconstruction function 412 generally operates to process the captured image frames in order to identify depths within the scene captured in the image frames. For example, the depth reconstruction function 412 can process stereo pairs of image frames in order to estimate depths based on different disparities within the image frames, where disparities in locations of common points in the stereo image frames are used to estimate depths. The depth reconstruction function 412 can also perform structure-from-motion estimation in order to estimate depths within the scene. Structure-from-motion refers to the fact that feature points within a scene can be estimated using image frames that are associated with different locations, thereby providing different perspectives of the scene. Motion parallax can be used to derive depth information of the scene, where motion parallax refers to the fact that objects move differently (such as by different amounts) when viewed from different locations depending on their depths from those locations.

A depth fusion, reconstruction, and verification function 414 generally operates to process the depth data determined by the depth data capture function 410 and the depth reconstruction function 412 in order to generate at least one accurate depth point cloud or other accurate depth data associated with the captured image frames. For example, the depth fusion, reconstruction, and verification function 414 can combine the depth data determined by the depth data capture function 410 and the depth reconstruction function 412, perform filtering or outlier detection to smooth or otherwise filter the depth data, and verify that determined depths appear consistent with each other and with the contents of the image frames. The dynamic adaptive planar transformation operation 404 does not require dense depth maps (which can be difficult to obtain for high-resolution image frames) and may only need adequate depth information for defining one or more projecting planes. The resulting depth point cloud or other depth data can adequately represent depths at a suitable resolution in order to allow the projecting plane(s) to be identified.

The data acquisition and processing operation 402 further includes a head pose capture and tracking function 416 and a head model estimation function 418. The head pose capture and tracking function 416 generally operates to obtain information related to the head pose of a user using a VST XR device and how the user's head pose changes over time. For example, the head pose capture and tracking function 416 may obtain inputs from an IMU, a head pose tracking camera, or other sensor(s) 180 of the electronic device 101 when the image frames are being captured. The head pose capture and tracking function 416 can also track how these inputs are changing. The head model estimation function 418 generally operates to build at least one model of the user's head poses, where the at least one model represents how the user's head poses might change in the future based on prior and current head poses or head pose changes of the user. The head model estimation function 418 can use any suitable technique for building models representing users' head pose changes.

The information related to the head pose of the user obtained by the head pose capture and tracking function 416 can be output to the dynamic adaptive planar transformation operation 404. The information related to the head pose of the user obtained by the head pose capture and tracking function 416 and the at least one model generated by the head model estimation function 418 can be provided to a head pose prediction function 420. The head pose prediction function 420 generally operates to estimate what the user's head pose will likely be when rendered images are actually displayed to the user. In many cases, for instance, image frames will be captured at one time and rendered images will be subsequently displayed to the user some amount of time later, and it is possible for the user to move his or her head during this intervening time period. The head pose prediction function 420 can therefore be used to estimate, for each image frame, what the user's head pose will likely be when a rendered image based on that image frame will be displayed to the user. As described below, part of this prediction can be based on an estimated latency of various operations within the architecture 400.

As shown in FIG. 4B, a 3D plane detection function 422 generally operates to identify potential planes or generally-planar surfaces within the captured image frames. For example, the 3D plane detection function 422 may receive and process the undistorted image frames and the depth information associated with the undistorted image frames to identify potential planes or generally-planar surfaces within the undistorted image frames. The 3D plane detection function 422 can use any suitable technique to identify planes or generally-planar surfaces, such as by processing depth point clouds or by using a trained deep neural network (DNN) or other trained machine learning model. The identified planes or generally-planar surfaces represent instances where projecting planes may be defined to support planar reprojection. For any identified plane or generally-planar surface, the 3D plane detection function 422 may extract that as a potential projecting plane.

A content and user focus analysis function 424 generally operates to process information in order to determine whether the user is focusing on any particular portion of a scene, such as whether the user is focusing his or her attention on one of the identified projecting planes. In some cases, this may occur as part of a foveation rendering operation. Foveation rendering refers to a process in which part of an image frame representing the portion of a scene on which a user is focused is rendered in higher resolution, while other parts of the image frame are rendered in lower resolution. The content and user focus analysis function 424 can use any suitable technique to identify whether the user is focusing on a particular part of a scene and, if so, which part of the scene is the subject of that focus. In some cases, for instance, the content and user focus analysis function 424 may use one or more eye tracking cameras.

A determination function 426 generally operates to determine whether the content and user focus analysis function 424 has identified an area of focus of the user within the scene. If the user is not focused on any particular area within the scene, there may be little or no need to perform planar reprojection. Instead, a time warping function 428 may be applied. The time warping function 428 can adjust the undistorted image frames to account for movement of the user's head (as estimated by the head pose prediction function 420), such as by rotating the undistorted image frames, translating the undistorted image frames, or both. An actual planar reprojection may not be needed here.

If the user is focused on at least one particular area within the scene, a determination function 430 can determine whether the 3D plane detection function 422 detected any potential projecting planes within the captured image frames. If so, a projecting plane selection function 432 generally operates to select one or more of the identified projecting planes based on where the user is directing his or her focus. For example, the projecting plane selection function 432 can identify which of the potential projecting planes identified by the 3D plane detection function 422 are within or near the area or areas where the user is directing his or her attention. For each selected projecting plane, a plane parameter extraction function 434 generally operates to identify one or more characteristics or features of that projecting plane. For instance, the plane parameter extraction function 434 may identify an origin of each selected projecting plane and a normal vector and a depth of that selected projecting plane at its origin. If the 3D plane detection function 422 does not detect any potential projecting planes within the captured image frames, a default projecting plane selection function 436 generally operates to select a default projecting plane within the captured image frames. The default projecting plane may represent a projecting plane having a known origin, normal vector, and depth. In some cases, the default projecting plane may be defined based on the general area of the scene on which the user is focused.

Note that the number of projecting planes selected here can vary dynamically, such as depending on the contents of the scene and the portion of the scene on which the user is currently focusing. For example, if the user is currently focusing on a computer display, one projecting plane may be selected. If the user is currently focusing on two or more computer displays simultaneously, two or more projecting planes may be selected. The dynamic adaptive planar transformation operation 404 here can dynamically identify the projecting planes as the scenes change and as the user's focus changes.

A reference camera creation function 438 generally operates to define one or more reference cameras, and a target camera creation function 440 generally operates to define one or more target cameras. As noted above with reference to FIGS. 3A through 3D, a reference camera represents a virtual camera that is created based on an associated projecting plane. A target camera represents a virtual camera that is created based on the expected position of a user's eye when a rendered image frame will be presented to the user. In this example, the reference camera creation function 438 can define each reference camera based on an associated one of the one or more selected projecting planes and the estimated head pose of the user when a rendered image frame will be presented to the user. For example, the reference camera creation function 438 can define each reference camera based on the expected distance from the associated projecting plane and the surface normal of the associated projecting plane. The target camera creation function 440 can define each target camera based on the estimated head pose of the user when a rendered image frame will be presented to the user. For instance, the target camera creation function 440 can estimate the location of the corresponding eye of the user when the user has a predicted head pose.

A projecting plane transformation function 442 generally operates to transform the undistorted image frames as projected onto the one or more selected projecting planes associated with the one or more reference cameras to one or more planes associated with the one or more target cameras. For example, the projecting plane transformation function 442 can use a current or predicted head pose of the user to define the desired planes associated with the one or more target cameras. For each selected projecting plane associated with a reference camera, the projecting plane transformation function 442 can identify a planar reprojection that transforms the selected projecting plane into a plane for the associated target camera. This allows the projecting plane transformation function 442 to transform the undistorted image frames as projected onto the selected projecting plane(s) and create one or more target image frames of the selected projecting plane(s).

A final view generation function 444 generally operates to process the target image frames from the projecting plane transformation function 442 and generate final views of the scene. For example, the final view generation function 444 may perform any desired post-processing of the target image frames to create one or more final views for the one or more target cameras. If there are multiple selected projecting planes, the final view generation function 444 may also integrate multiple target image frames of the multiple projecting planes, such as via blending, to create the final views. A final view rendering function 446 generally operates to render the final views and initiate display of rendered images, such as on one or more displays 160 of the VST XR device.

In this example, a latency estimation function 448 is used to identify the estimated latency between capture of image frames and display of rendered images. For example, the latency estimation function 448 may estimate the amount of time needed for various operations in the architecture 400 to be performed, such as capturing the image frames, processing the image frames, identifying projecting planes in the image frames, performing planar transformations, and rendering/displaying resulting images. The latency estimation function 448 can provide an estimated latency to the head pose prediction function 420. The head pose prediction function 420 can use the estimated latency to predict what the user's head poses will be in the future after a time period that represents the estimated latency has elapsed. This allows the head pose prediction function 420 to predict the user's head pose based on the expected latency of the pipeline. Note that the latency can change over time, and the latency estimation function 448 is able to identify current latency of the pipeline so that the head pose prediction function 420 can dynamically consider the changing latencies when predicting the user's head pose over time.

Among other things, the architecture 400 can dynamically define projecting planes in captured scenes and identify corresponding reference cameras via functions like plane detection and user focus analysis. Default projecting planes can be used when there are not any planes detected and captured image contents should be focused. The architecture 400 can also dynamically transform views of the projecting planes from the reference cameras to target cameras in order to create final views at the target cameras, which can be done while also providing viewpoint matching and parallax correction. In addition, the architecture 400 can dynamically decide how many projecting planes and associated transformations are used to generate final views based on captured 3D scene contents and the focus of the user. For example, the architecture 400 can determine whether the user is focusing on no plane within the scene, a single plane within the scene, or multiple planes within the scene. Planar transformation may not be needed while the user is not focusing on any scene contents, and one or more planar transformations may be performed in response to the user focusing on a single plane within the scene or on multiple planes within the scene. Among other things, this can help to reduce computational loads in the VST XR device. This can also support a number of possible use cases for the architecture 400, such as generating new image frames to compensate for head pose changes during final view rendering, interpolating new image frames in an existing frame sequence for increasing the frame rate, or providing clear contents for foveation rendering.

Although FIGS. 4A and 4B illustrate one example of a functional architecture 400 supporting dynamically-adaptive planar transformations for VST XR, various changes may be made to FIGS. 4A and 4B. For example, various components or functions in FIGS. 4A and 4B may be combined, further subdivided, replicated, omitted, or rearranged and additional components or functions may be added according to particular needs.

FIGS. 5 through 8 illustrate example dynamically-adaptive planar transformations for VST XR in accordance with this disclosure. For ease of explanation, the dynamically-adaptive planar transformations shown in FIGS. 5 through 8 are described as being performed by the electronic device 101 in the network configuration 100 of FIG. 1, where the electronic device 101 may implement the architecture 400 of FIGS. 4A and 4B. However, the dynamically-adaptive planar transformations shown in FIGS. 5 through 8 may be used with any other suitable device(s) and in any other suitable system(s), and the dynamically-adaptive planar transformations may be provided using any other suitable architecture(s). Also, the electronic device 101 and the architecture 400 may be used to perform any other suitable dynamically-adaptive planar transformations.

Figure 5:
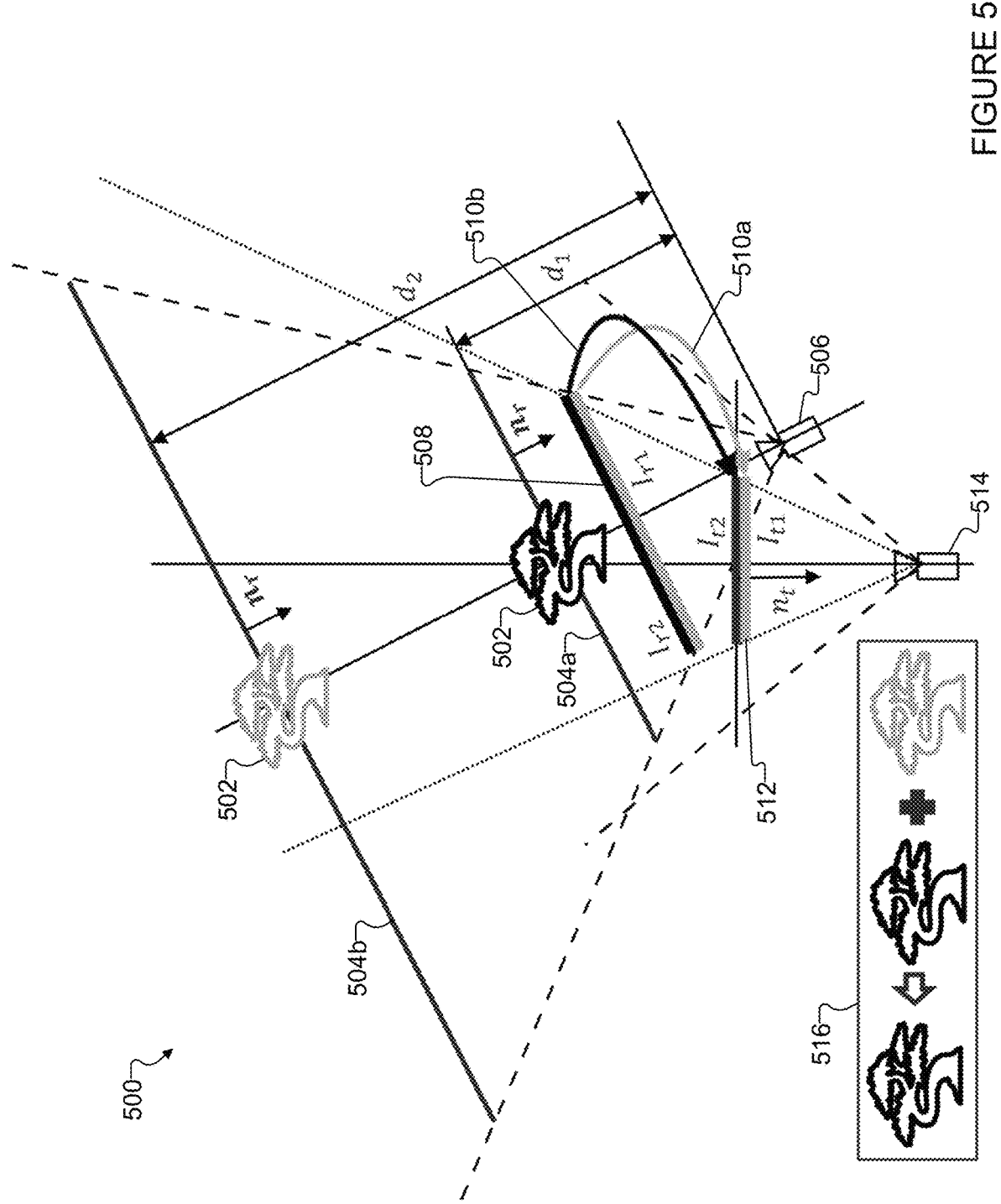
FIGS. 5 through 8 illustrate example dynamically-adaptive planar transformations for VST XR in accordance with this disclosure.

As shown in FIG. 5, a planar transformation 500 involves a 3D scene including an object 502 (which represents a tree in this example), where the object 502 is being presented using two projecting planes 504a-504b. It is assumed in this example that the projecting planes 504a-504b have the same normal vector $n_r$ but are located at different depths $d_1$ and $d_2$. In other words, it is assumed that the projecting planes 504a-504b are substantially parallel to one another. It is also assumed that a single reference camera 506 is denoted $c_r$, and that image frames are projected to the projecting planes 504a-504b and are available at an image plane 508 of the reference camera 506. More specifically, an image frame $I_{r1}$ is created by the projecting plane 504a for the reference camera 506 at the image plane 508, and an image frame $I_{r2}$ is created by the projecting plane 504b for the reference camera 506 at the image plane 508. The image frame $I_{r1}$ is transformed via a planar transformation 510a to an image plane 512 of a target camera 514, and the image frame $I_{r2}$ is transformed via a planar transformation 510b to the image plane 512 of the target camera 514. The resulting target image frames can be integrated or otherwise combined as shown in block 516 to create a final view of the scene.

Figure 6:
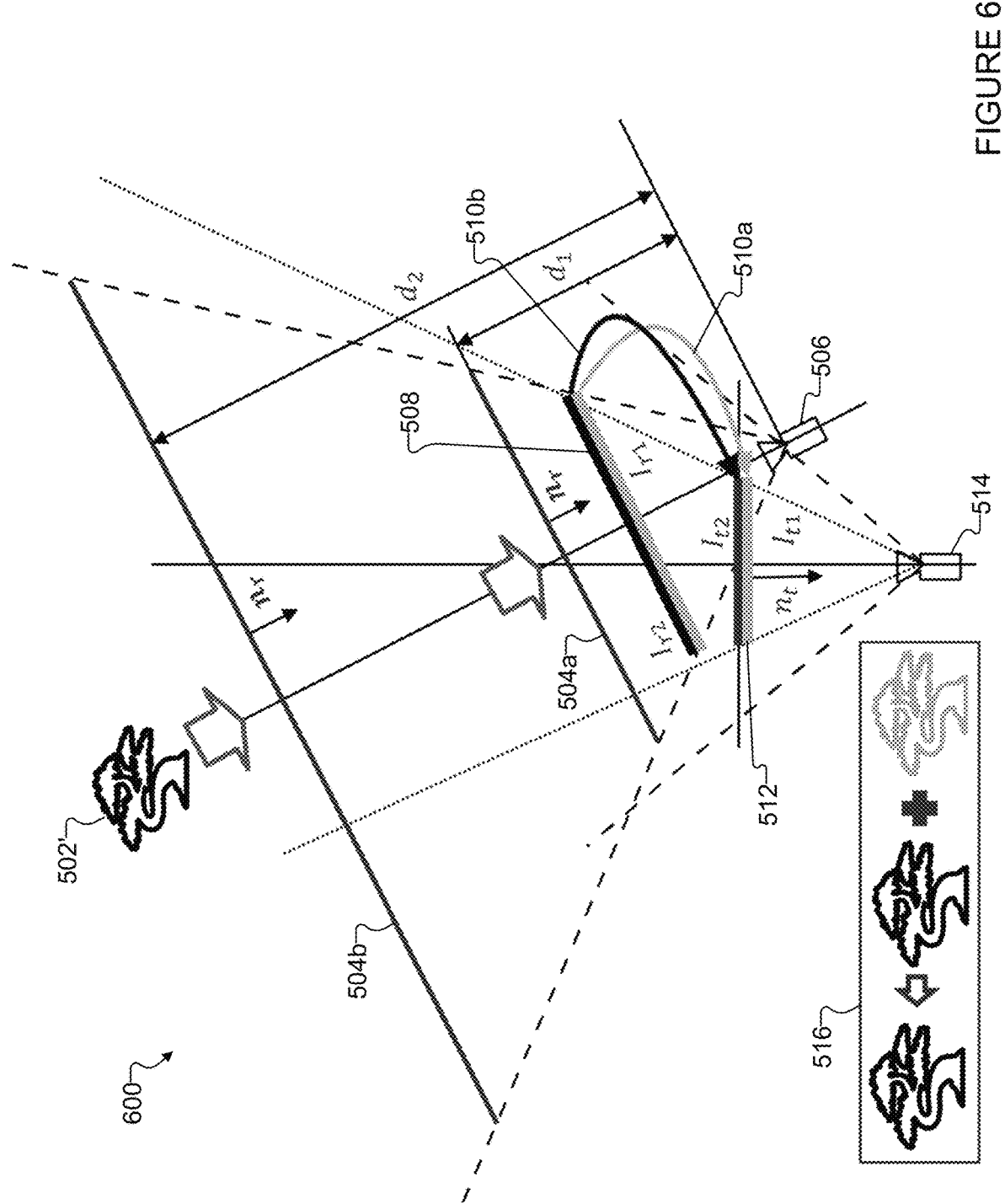

As shown in FIG. 6, a planar transformation 600 involves a 3D scene including an object 502' (which represents a tree in this example), where the object 502' is being presented using two projecting planes 504a-504b. However, unlike the example of FIG. 5, the object 502' in FIG. 6 does not actually lie on one of the projecting planes 504a-504b. This may occur, for example, when one or more 3D objects on which the user is focusing are not on a selected projecting plane. In these cases, each 3D object 502' can be projected onto the selected projecting planes 504a-504b. At that point, the planar reprojection described with reference to FIG. 5 may occur.

In some embodiments, the planar transformations 510a-510b in FIG. 5 or FIG. 6 may occur as follows. The projecting planes 504a-504b can be defined with respect to the reference camera 506, such as in the following manner.

$$n_r^T X + d_1 = 0$$
$$n_r^T X + d_2 = 0$$

Here, $n_r$ represents the normal vector of each projecting plane 504a-504b, $d_1$ represents the depth of the projecting plane 504a, and $d_2$ represents the depth of the projecting plane 504b.

The image frame $I_{r1}$ from the projecting plane 504a is projected from the image plane 508 of the reference camera 506 onto the image plane 512 of the target camera 514, leading to the creation of a target image frame $I_{t1}$. In some cases, this transformation may be expressed as follows.

$$p_{t1}(x, y) = H_1 p_{r1}(x, y)$$

Here, $p_{r1}$ represents pixels of the image frame $I_{r1}$, and $p_{t1}$ represents pixels of the target image frame $I_{t1}$. Also, $H_1$ represents the transformation matrix of the planar transformation 510a, which in some cases may be defined as follows.

$$H_1 = R - t V_1^T$$

Here, $V_1$ represents a parameter of the projecting plane 504a, which in some cases may be defined as follows.

$$V_1 = \frac{n_{r1}}{d_1}$$

Here, $n_{r1}$ represents the normal vector of the projecting plane 504a.

The transformation between the reference camera 506 and the target camera 514 in some cases may be expressed as follows.

$$S = [R \,|\, t]$$

Here, R represents a rotation matrix defining rotation between the reference camera 506 and the target camera 514, and t represents a translation vector between the reference camera 506 and the target camera 514. This transformation can be rewritten as follows.

$$S = S_t S_r^{-1}$$

Here, $S_t$ represents the pose of the target camera 514, which in some cases may be defined as follows.

$$S_t = [R_t \,|\, t_t]$$

Here, $R_t$ represents a rotation matrix of the target camera 514, and $t_t$ represents a translation vector of the target camera 514. The pose of the reference camera 506 may be denoted as $S_r$, which in some cases may be defined as follows.

$$S_r = [R_r \,|\, t_r]$$

Here, $R_r$ represents a rotation matrix of the reference camera 506, and $t_r$ represents a translation vector of the reference camera 506.

Similarly, the image frame $I_{r2}$ from the projecting plane 504b is projected from the image plane 508 of the reference camera 506 onto the image plane 512 of the target camera 514, leading to the creation of a target image frame $I_{t2}$. In some cases, this transformation may be expressed as follows.

$$p_{t2}(x, y) = H_2 p_{r2}(x, y)$$

Here, $p_{r2}$ represents pixels of the image frame $I_{r2}$, and $p_{t2}$ represents pixels of the target image frame $I_{t2}$. Also, $H_2$ represents the transformation matrix of the planar transformation 510b, which in some cases may be defined as follows.

$$H_2 = R - t V_2^T$$

Here, $V_2$ represents a parameter of the projecting plane 504b, which in some cases may be defined as follows.

$$V_2 = \frac{n_{r2}}{d_2}$$

Here, $n_{r2}$ represents the normal vector of the projecting plane 504b. Note that it is assumed here the two projecting planes 504a-504b have same the normal vector, meaning $n_{r1}=n_{r2}=n_r$.

In the above discussion, a forward transformation is being performed to transform image frames at the image plane 508 into image frames at the image plane 512. If needed, a backward transformation to transform image frames at the image plane 512 into image frames at the image plane 508 may be performed, such as to eliminate irregular sampling with interpolation. In some cases, the backward transformation may be expressed as follows.

$$p_r(x, y) = H^{-1} p_t(x, y)$$

where:

$$H^{-1} = R^{-1}\left(I + \frac{tV^T R^{-1}}{1 - V^T R^{-1} t}\right)$$

$$V = \frac{n}{d}$$

A final view image $I_t$ can be generated by integrating the two target image frames $I_{t1}$ and $I_{t2}$. In some cases, this can be expressed in the following manner.

$$I_t = \mathcal{B}(I_{t1}, I_{t2})$$

Figure 7:
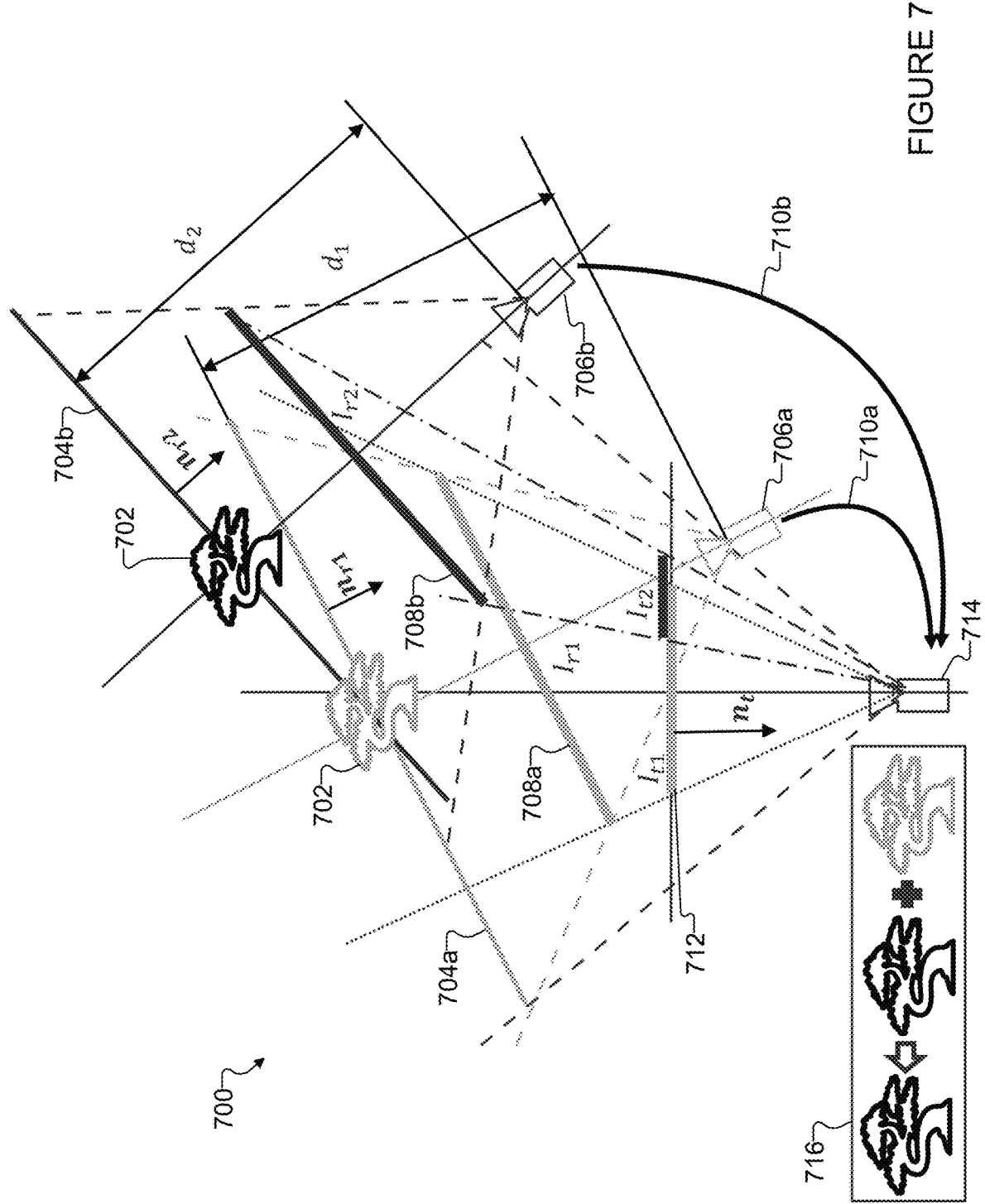

As shown in FIG. 7, a planar transformation 700 involves a 3D scene including an object 702 (which represents a tree in this example), where the object is being presented using two projecting planes 704a-704b that have different orientations. As a result, the projecting planes 704a-704b have different normal vectors $n_{r1}$ and $n_{r2}$ and are located at different depths $d_1$ and $d_2$. Two reference cameras 706a-706b are denoted $c_{r1}$ and $c_{r2}$, and image frames are projected to the projecting planes 704a-704b and are available at respective image planes 708a-708b. More specifically, an image frame $I_{r1}$ is created by the projecting plane 704a for the reference camera 706a at the image plane 708a, and an image frame $I_{r2}$ is created by the projecting plane 704b for the reference camera 706b at the image plane 708b. The image frame $I_{r1}$ is transformed via a planar transformation 710a to an image plane 712 of a target camera 714, and the image frame $I_{r2}$ is transformed via a planar transformation 710b to the image plane 712 of the target camera 714. The resulting target image frames can be integrated or otherwise combined as shown in block 716 to create a final view of the scene.

In some embodiments, the planar transformations 710a-710b in FIG. 7 may occur as follows. The projecting planes 704a-704b can be defined with respect to their reference cameras 706a-706b as follows.

$$n_{r1}^T X + d_1 = 0$$

$$n_{r2}^T X + d_2 = 0$$

Here, $n_{r1}$ represents the normal vector of the projecting plane 704a, $d_1$ represents the depth of the projecting plane 704a, $n_{r2}$ represents the normal vector of the projecting plane 704b, and $d_2$ represents the depth of the projecting plane 704b.

The image frame $I_{r1}$ from the projecting plane 704a is projected from the image plane 708a of the reference camera 706a onto the image plane 712 of the target camera 714, leading to the creation of a target image frame $I_{t1}$. In some cases, this transformation may be expressed as follows.

$$p_{t1}(x, y) = H_1 p_{r1}(x, y)$$

Here, $p_{r1}$ represents pixels of the image frame $I_{r1}$, and $p_{t1}$ represents pixels of the target image frame $I_{t1}$. Also, $H_1$ represents the transformation matrix of the planar transformation 710a, which in some cases may be defined as follows.

$$H_1 = R_1 - t_1 V_1^T$$

Here, $V_1$ represents a parameter of the projecting plane 704a, which in some cases may be defined as follows.

$$V_1 = \frac{n_{r1}}{d_1}$$

Here, $n_{r1}$ represents the normal vector of the projecting plane 704a.

The transformation between the reference camera 706a and the target camera 714 for the first projecting plane 704a could be expressed as follows.

$$S_1 = [R_1 \mid t_1]$$

Here, $R_1$ represents a rotation matrix defining rotation between the reference camera 706a and the target camera 714, and $t_1$ represents a translation vector between the reference camera 706a and the target camera 714. This transformation can be rewritten as follows.

$$S_1 = S_t S_{r1}^{-1}$$

Here, $S_t$ represents the pose of the target camera 714, which could be defined as follows.

$$S_t = [R_t \mid t_t]$$

Here, $R_t$ represents a rotation matrix of the target camera 714, and $t_t$ represents a translation vector of the target camera 714. The pose of the reference camera 706a may be denoted as $S_{r1}$, which in some cases may be defined as follows.

$$S_{r1} = [R_{r1} \mid t_{r1}]$$

Here, $R_{r1}$ represents a rotation matrix of the reference camera 706a, and $t_{r1}$ represents a translation vector of the reference camera 706a.

Similarly, the image frame $I_{r2}$ from the projecting plane 704b is projected from the image plane 708b of the reference camera 706b onto the image plane 712 of the target camera 714, leading to the creation of a target image frame $I_{t2}$. In some cases, this transformation may be expressed as follows.

$$p_{t2}(x, y) = H_2 p_{r2}(x, y)$$

Here, $p_{r2}$ represents pixels of the image frame $I_{r2}$, and $p_{t2}$ represents pixels of the target image frame $I_{t2}$. Also, $H_2$ represents the transformation matrix of the planar transformation 710b, which in some cases may be defined as follows.

$$H_2 = R_2 - t_2 V_2^T$$

Here, $V_2$ represents a parameter of the projecting plane 704b, which in some cases may be defined as follows.

$$V_2 = \frac{n_{r2}}{d_2}$$

Here, $n_{r2}$ represents the normal vector of the projecting plane 704b.

The transformation between the reference camera 706b and the target camera 714 for the second projecting plane 704b could be expressed as follows.

$$S_2 = [R_2 \mid t_2]$$

Here, $R_2$ represents a rotation matrix defining rotation between the reference camera 706b and the target camera 714, and $t_2$ represents a translation vector between the reference camera 706b and the target camera 714. This transformation can be rewritten as follows.

$$S_2 = S_t S_{r2}^{-1}$$

Here, $S_t$ represents the pose of the target camera 714, which could be defined as described above. The pose of the reference camera 706b may be denoted as $S_{r2}$, which in some cases may be defined as follows.

$$S_{r2} = [R_{r2} \mid t_{r2}]$$

Here, $R_{r2}$ represents a rotation matrix of the reference camera 706b, and $t_{r2}$ represents a translation vector of the reference camera 706b.

In the above discussion, forward transformations are being performed to transform image frames at the image planes 708a-708b into image frames at the image plane 712. If needed, backward transformations to transform image frames at the image plane 712 into image frames at the image planes 708a-708b may be performed, such as to eliminate irregular sampling with interpolation. In some cases, the backward transformation may be expressed as follows:

$$\begin{cases} p_{r1}(x, y) = H_1^{-1} p_{t1}(x, y) \\ p_{r2}(x, y) = H_2^{-1} p_{t2}(x, y) \end{cases}$$

where:

$$\begin{cases} H_1^{-1} = R_1^{-1}\left(I + \frac{t_1 V_1^T R_1^{-1}}{1 - V_1^T t_1}\right) \\ H_2^{-1} = R_2^{-1}\left(I + \frac{t_2 V_2^T R_2^{-1}}{1 - V_2^T t_2}\right) \end{cases}$$

$$\begin{cases} V_1 = \frac{n_{r1}}{d_1} \\ V_2 = \frac{n_{r2}}{d_2} \end{cases}$$

A final view image $I_t$ can be generated by integrating the two target image frames $I_{t1}$ and $I_{t2}$. In some cases, this can be expressed in the following manner.

$$I_t = \mathcal{B}(I_{t1}, I_{t2})$$

Figure 8:
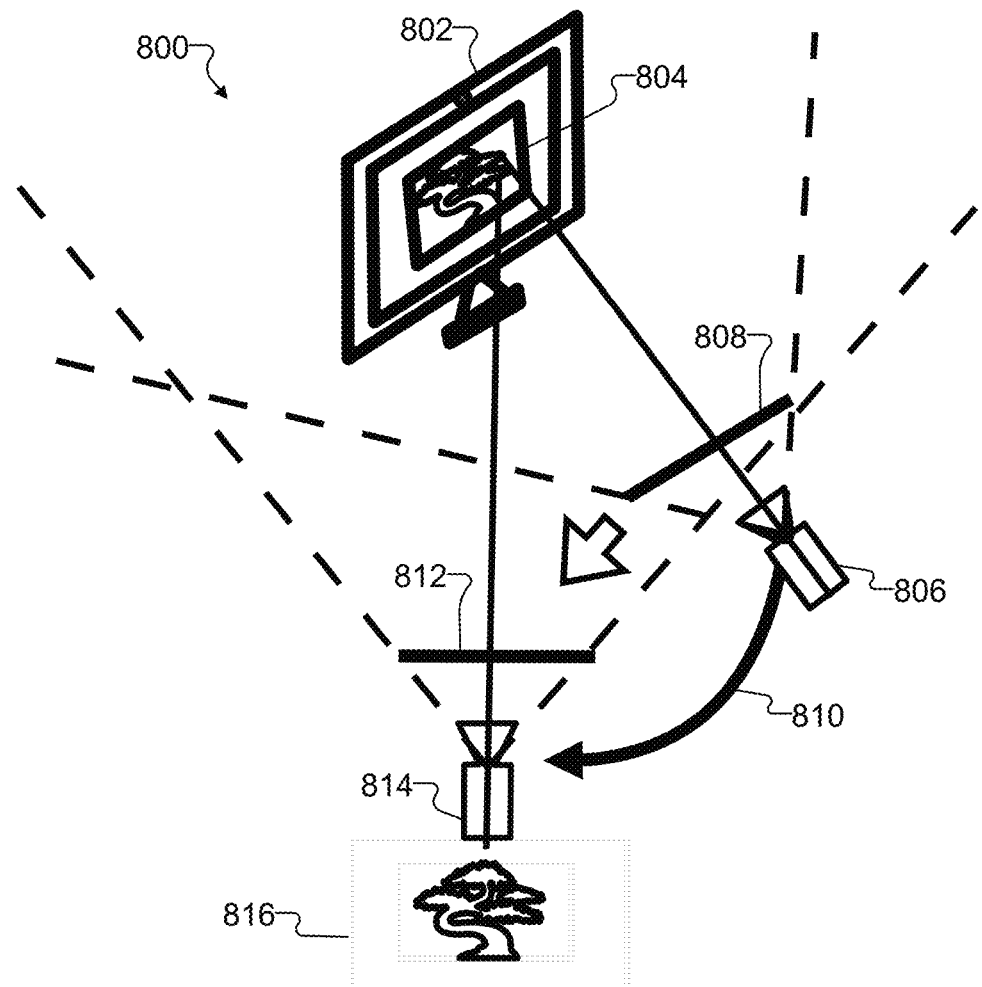

As shown in FIG. 8, a planar transformation 800 involves a 3D scene including an object 802 (which represents a computer display in this example). It may be determined that the user of a VST XR device is focusing on a specific region of interest (ROI) 804 associated with the object 802. This may be determined in any suitable manner, such as by using one or more eye tracking cameras. A reference camera 806 associated with an image plane 808 is defined, and a planar transformation 810 can convert image frames from the image plane 808 to an image plane 812 of a target camera 814. However, the planar transformation 810 may be used only for the area of the image frames containing the region of interest 804, so resulting image frames 816 may contain only that region of interest 804. This could help to further reduce computational loads on the VST XR device. Note that similar operations may occur for more than one object or projecting plane.

Although FIGS. 5 through 8 illustrate examples of dynamically-adaptive planar transformations for VST XR, various changes may be made to FIGS. 5 through 8. For example, the specific planar transformations shown here are examples only, and the actual planar transformation or transformations used in any given situation can vary depending on the circumstances.

Figure 9:
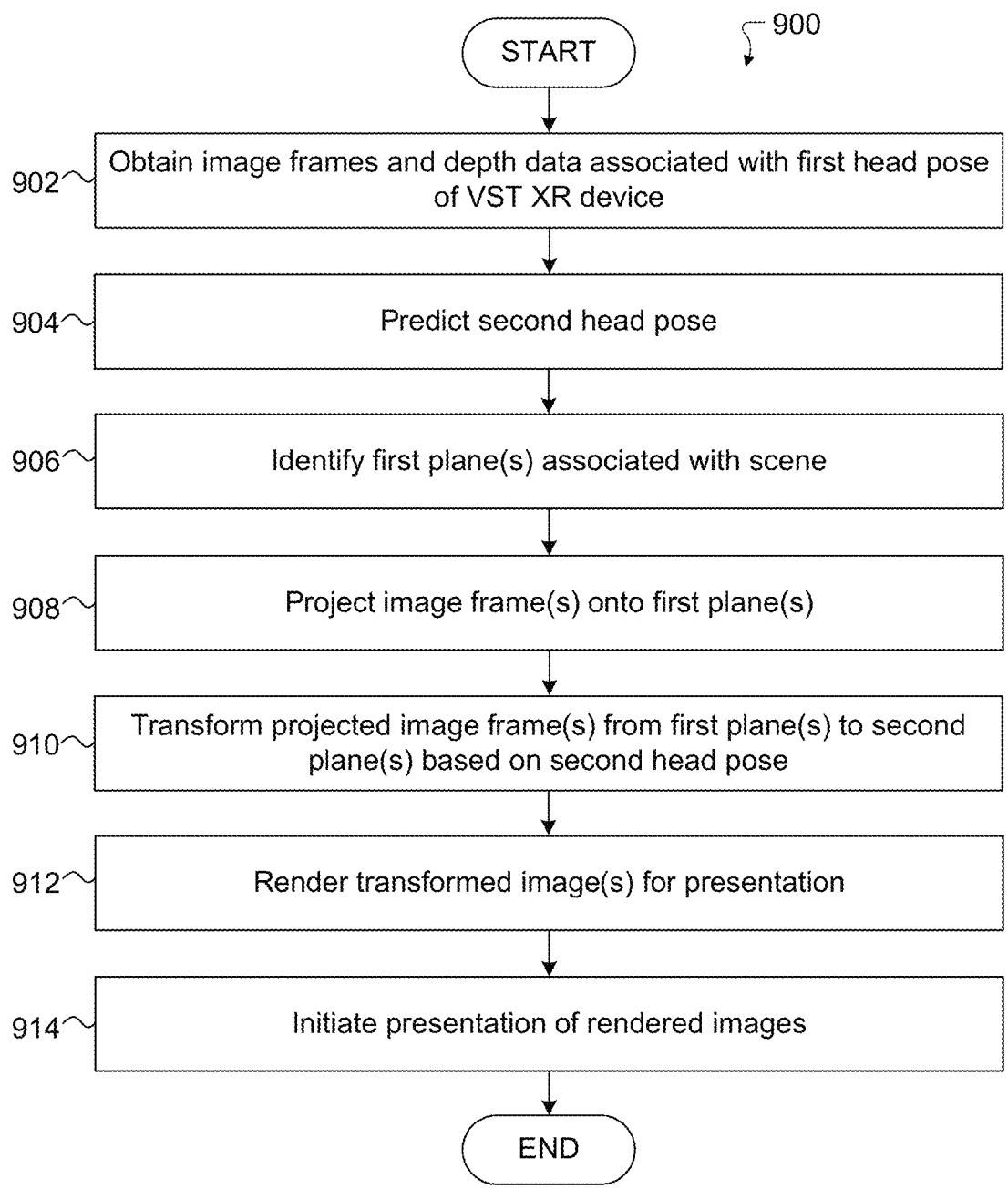
FIG. 9 illustrates an example method for dynamically-adaptive planar transformations for VST XR in accordance with this disclosure.

FIG. 9 illustrates an example method 900 for dynamically-adaptive planar transformations for VST XR in accordance with this disclosure. For ease of explanation, the method 900 of FIG. 9 is described as being performed using the electronic device 101 in the network configuration 100 of FIG. 1, where the electronic device 101 may support the architecture 400 of FIGS. 4A and 4B. However, the method 900 may be performed using any other suitable device(s) and in any other suitable system(s), and the method 900 may be used with any other suitable architecture(s).

As shown in FIG. 9, image frames and depth data associated with a first head pose of a user of a VST XR device are obtained at step 902. This may include, for example, the processor 120 of the electronic device 101 obtaining multiple image frames captured using one or more imaging sensors 180 of the VST XR device while the user's head is at the first head pose. This may also include the processor 120 of the electronic device 101 receiving, generating, or otherwise obtaining depth data associated with the image frames. In some cases, the image frames may be pre-processed, such as by undergoing camera undistortion. A second head pose of the user's head is predicted at step 904. This may include, for example, the processor 120 of the electronic device 101 using an estimated latency of the architecture 400 to predict when rendered images based on the image frames will be displayed to the user.

One or more first planes associated with the scene being imaged are identified at step 906. This may include, for example, the processor 120 of the electronic device 101 identifying one or more projecting planes within the scene. In some cases, at least one of the one or more projecting planes may be identified based on a current or recent focus of the user. At least some of the image frames are projected onto the first plane(s) at step 908. This may include, for example, the processor 120 of the electronic device 101 projecting at least some of the image frames onto the identified projecting plane(s). This can result in generation of one or more projected image frames.

The projected image frame or frames are transformed from the one or more first planes to one or more second planes corresponding to the second head pose at step 910. This may include, for example, the processor 120 of the electronic device 101 performing one or more dynamic planar transformations in order to transform the one or more projected image frames and generate one or more transformed image frames. The transformed image frame or frames are rendered at step 912, and display of the resulting rendered images is initiated at step 914. This may include, for example, the processor 120 of the electronic device 101 rendering one or more images based on the transformed image frame(s) and displaying the rendered image(s) on at least one display panel of the VST XR device.

Although FIG. 9 illustrates one example of a method 900 for dynamically-adaptive planar transformations for VST XR, various changes may be made to FIG. 9. For example, while shown as a series of steps, various steps in FIG. 9 may overlap, occur in parallel, occur in a different order, or occur any number of times (including zero times).

It should be noted that the functions described above can be implemented in an electronic device 101, 102, 104, server 106, or other device(s) in any suitable manner. For example, in some embodiments, at least some of the functions can be implemented or supported using one or more software applications or other software instructions that are executed by the processor 120 of the electronic device 101, 102, 104, server 106, or other device(s). In other embodiments, at least some of the functions can be implemented or supported using dedicated hardware components. In general, the functions described above can be performed using any suitable hardware or any suitable combination of hardware and software/firmware instructions. Also, the functions described above can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining (i) multiple image frames captured using one or more imaging sensors of a video see-through (VST) extended reality (XR) device while a user's head is at a first head pose and (ii) depth data associated with the image frames;
   predicting a second head pose of the user's head when rendered images will be displayed;
   determining whether the user is focusing on no plane within a scene captured in the image frames or on one or more planes within the scene; and
   in response to the user focusing on the one or more planes within the scene:
     projecting at least one of the image frames onto one or more first planes to generate at least one projected image frame, the one or more first planes associated with the one or more planes on which the user is focusing;
     transforming the at least one projected image frame from the one or more first planes to one or more second planes corresponding to the second head pose to generate at least one transformed image frame; and
     rendering the at least one transformed image frame for presentation on one or more displays of the VST XR device.

2. The method of claim 1, wherein the one or more planes on which the user is focusing are identified based on a gaze of the user.

3. The method of claim 2, further comprising:
   when the user is not focusing on any plane, performing a time warp to transform the images frames based on the second head pose.

4. The method of claim 1, wherein the at least one projected image frame is transformed from the one or more first planes to the one or more second planes based on one or more normal vectors of the one or more first planes, one or more depths of the one or more first planes, and a difference between the first head pose and the second head pose.

5. The method of claim 1, wherein the one or more first planes comprise two or more planes associated with one or more objects in the scene captured in the image frames.

6. The method of claim 1, wherein the one or more planes within the scene are associated with one or more objects in the scene.

7. The method of claim 1, wherein the depth data has a resolution that is equal to or less than half a resolution of each of the image frames.

8. A video see-through (VST) extended reality (XR) device comprising:
   one or more displays; and
   at least one processing device configured to:
     obtain (i) multiple image frames captured using one or more imaging sensors while a user's head is at a first head pose and (ii) depth data associated with the image frames;
     predict a second head pose of the user's head when rendered images will be displayed;
     determine whether the user is focusing on one or more planes within a scene captured in the image frames based on a gaze of the user;

generate at least one transformed image frame, wherein, to generate the at least one transformed image frame, the at least one processing device is configured to:
  in response to determining that the user is focusing on the one or more planes, project at least one of the image frames onto one or more first planes to generate at least one projected image frame and transform the at least one projected image frame from the one or more first planes to one or more second planes corresponding to the second head pose, the one or more first planes associated with the one or more planes on which the user is focusing; or
  in response to determining that the user is not focusing on any plane, perform a time warp to transform the images frames based on the second head pose; and
render the at least one transformed image frame for presentation on the one or more displays.

9. The VST XR device of claim 8, wherein:
the one or more planes within the scene comprise multiple planes associated with multiple objects in the scene at different depths within the scene; and
the at least one transformed image frame provides a clear view of the multiple objects.

10. The VST XR device of claim 9, wherein;
the multiple objects include multiple planar surfaces;
the at least one processing device is further configured to identify the planar surfaces in the image frames; and
the one or more first planes are associated with one or more of the planar surfaces.

11. The VST XR device of claim 8, wherein the at least one processing device is configured to transform the at least one projected image frame from the one or more first planes to the one or more second planes based on one or more normal vectors of the one or more first planes, one or more depths of the one or more first planes, and a difference between the first head pose and the second head pose.

12. The VST XR device of claim 8, wherein the one or more first planes comprise two or more planes associated with one or more objects in the scene captured in the image frames.

13. The VST XR device of claim 8, wherein, to perform the time warp, the at least one processing device is configured to apply a translation, a rotation, or both to the images frames.

14. The VST XR device of claim 8, wherein the depth data has a resolution that is equal to or less than half a resolution of each of the image frames.

15. A non-transitory machine readable medium containing instructions that when executed cause at least one processor of a video see-through (VST) extended reality (XR) device to:
  obtain (i) multiple image frames captured using one or more imaging sensors of the VST XR device while a user's head is at a first head pose and (ii) depth data associated with the image frames;
  predict a second head pose of the user's head when rendered images will be displayed;
  determine whether the user is focusing on no plane within a scene captured in the image frames or on one or more planes within the scene; and
  in response to the user focusing on the one or more planes within the scene:
    project at least one of the image frames onto one or more first planes to generate at least one projected image frame, the one or more first planes associated with the one or more planes on which the user is focusing;
    transform the at least one projected image frame from the one or more first planes to one or more second planes corresponding to the second head pose to generate at least one transformed image frame; and
    render the at least one transformed image frame for presentation on one or more displays of the VST XR device.

16. The non-transitory machine readable medium of claim 15, wherein the non-transitory machine readable medium further contains instructions that when executed cause the at least one processor to identify the one or more planes on which the user is focusing based on a gaze of the user.

17. The non-transitory machine readable medium of claim 16, wherein the non-transitory machine readable medium further contains instructions that when executed cause the at least one processor, when the user is not focusing on any plane, to perform a time warp to transform the images frames based on the second head pose.

18. The non-transitory machine readable medium of claim 15, wherein the instructions that when executed cause the at least one processor to transform the at least one projected image frame from the one or more first planes to the one or more second planes comprise:
  instructions that when executed cause the at least one processor to transform the at least one projected image frame from the one or more first planes to the one or more second planes based on one or more normal vectors of the one or more first planes, one or more depths of the one or more first planes, and a difference between the first head pose and the second head pose.

19. The non-transitory machine readable medium of claim 15, wherein the one or more first planes comprise two or more planes associated with one or more objects in the scene captured in the image frames.

20. The non-transitory machine readable medium of claim 15, wherein the one or more first planes represent the one or more planes on which the user is focusing.

* * * * *